United States Patent [19]

Strantz

[11] 4,349,979
[45] Sep. 21, 1982

[54] BAIT FISH HOLDER

[75] Inventor: Ralph M. Strantz, St. Paul, Minn.

[73] Assignee: Lund Lures, Inc., Spring Park, Minn.

[21] Appl. No.: 189,639

[22] Filed: Sep. 22, 1980

[51] Int. Cl.³ .......................................... A01K 83/06
[52] U.S. Cl. .................................................. 43/44.8
[58] Field of Search ...................... 43/44.2, 44.4, 44.6, 43/44.8, 43.16

[56] References Cited

U.S. PATENT DOCUMENTS

| | | | |
|---|---|---|---|
| 2,476,126 | 7/1949 | Weiss | 43/44.2 |
| 2,668,387 | 2/1954 | Gallardo | 43/44.4 |
| 3,284,945 | 11/1966 | Kurtis | 43/44.2 |
| 3,400,484 | 9/1968 | Beard | 43/44.6 |
| 3,905,149 | 9/1975 | McCloud | 43/44.2 |

FOREIGN PATENT DOCUMENTS 977270  3/1951  France .................... 43/44.2

Primary Examiner—Nicholas P. Godici
Attorney, Agent, or Firm—Schroeder, Siegfried, Vidas, Steffey & Arrett

[57] ABSTRACT

An elongated flexible plastic member having barbs at one end thereof and a plurality of transverse holes therethrough for use with a lure or hook to maintain a bait fish on a fishing line.

4 Claims, 6 Drawing Figures

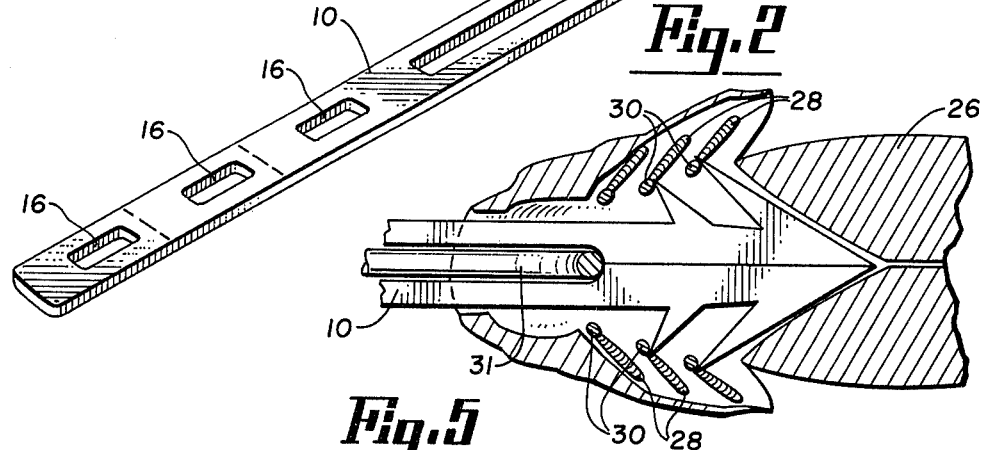
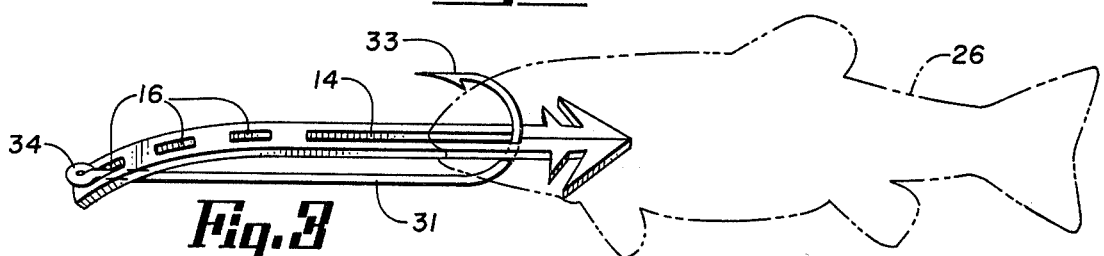
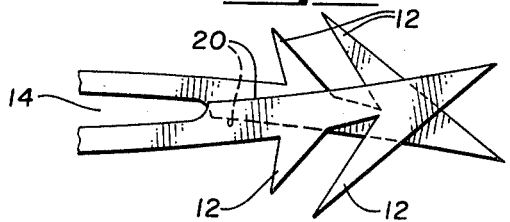
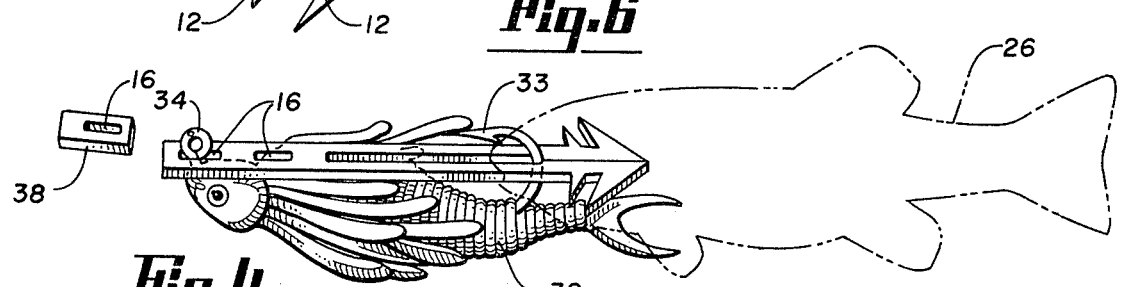
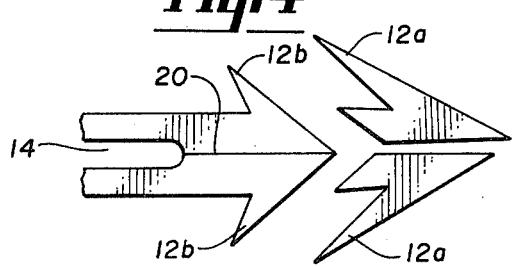

BAIT FISH HOLDER

BACKGROUND OF PRIOR ART

When fishing with a minnow or similar live bait, a number of problems frequently occur. Hooking the minnow through the roof of the mouth or lip to lip permits the minnow to maintain a normal swimming posture in the water, but provides a weak connection so that the minnow is often lost when casting or when the bait is pulled through weeds or debris in the water. A fish striking behind the hook may also occasionally tear the minnow free of the hook.

Hooking the minnow through the gills on the other hand, while improving the strength of the bait-hook link, causes the minnow to have a poor posture in the water. This is especially a problem as the bait nears death, which is often accelerated by gill damage done by the hook.

BRIEF SUMMARY OF THE INVENTION

The present invention relates to a device for maintaining a minnow or other live bait fish on a fishing line. The device is an arrow-like elongated flexible plastic member having one or more rearwardly and outwardly projecting barbs at one end thereof. A plurality of transverse holes in the member permit it to be fitted on a fish hook. A longitudinal slit extending rearwardly from the barbed end allows the device to be squeezed so that the barbs overlap each other thereby easing insertion of the device into the minnow's mouth.

The barbs lodge in the gills of the minnow firmly anchoring it to the hook. The hook to which the line is attached, however, only passes lip to lip or through the roof of the mouth of the minnow thereby permitting the minnow to maintain an improved swimming posture in the water. Also, unlike a gill-hooked minnow, the barbs of the device of this invention do not pass through the gill structure to the outside of the minnow. Therefore, gill tissue rupture is minimized and the life of the bait fish may be prolonged.

BRIEF DESCRIPTION OF THE DRAWINGS

FIG. 1 is a plan view of the preferred embodiment of the invention.

FIG. 2 shows a cut-away sectional view of a bait fish with the device of the invention lodged in its gills.

FIG. 3 is a view of the barbed portions of the device squeezed so that one portion overlaps the other for easier insertion into the mouth of the bait fish.

FIG. 4 shows the barbed end of the device with the forward barbs cut off for use with a small minnow.

FIG. 5 shows the device in use with a plain hook to hold a minnow.

FIG. 6 shows the device as used in a jig and minnow arrangement.

DETAILED DESCRIPTION OF THE INVENTION

The device of the present invention is generally designated by the numeral 10. It is an elongated flexible or semi-flexible plastic member having at least one barb 12 near an end thereof extending outwardly and rearwardly from the member end. Several transverse holes or apertures are spaced along the body of the member. Aperture 14 nearest the barbed end is preferably an elongated slot. At least one transverse hole 16, usually smaller than slot 14, is included behind slot 14.

The preferred embodiment includes a longitudinal slit 20 which runs through the device 10 from the barbed end to slot 14. Slit 20 permits the resulting opposing end halves to be folded one over the other as shown in FIG. 3 thereby facilitating insertion into or removal of the device from the bait fish.

The barbed end of the device is inserted through the mouth of the bait fish 26 until the barbs become lodged in the gill slits 28 as shown in FIG. 2. Cartilaginous material 30 at the base of the gill slits provides the secure anchor for the barbs.

The preferred embodiment also includes at least two pairs, 12a and 12b, of oppositely disposed barbs giving the device an arrow-like appearance. The barbs of the forward pair 12a are preferably larger than those of rearward pair 12b. When a very small minnow is being used with a mouth and/or gill structure which cannot accommodate the large barbs 12a, those barbs may be cut off as shown in FIG. 4. The smaller pair of barbs 12b are sufficient to securely hold the same minnow.

The device may be used either with a plain hook 31 as shown in FIG. 5 or with a hook and jig 32 as shown in FIG. 6. Hook end 33 hooks into the mouth of minnow 26 passing through aperture 14 as it does so. Aperture 14 is preferably an elongated slot to more easily receive hook end 33. Hook eye 34 to which the line or leader, not shown, is attached passes back through one of the holes 16 thereby securing the device on the hook.

As shown in FIG. 6, a rear-end portion 38 may be cut off of the device to prevent undesired drag or wobble when shorter hooks are used so that hook eye 34 passes through one of the more forward holes 16.

The preferred form of the invention which is shown in the drawings may be fashioned as a stamping from a flat sheet of plastic. Other forms, however, may be contemplated without departing from the teachings of the invention. In particular, a generally cylindrical body shape could also be used.

What is claimed is:

1. In combination with a fish hook having a barbed point at one end thereof and an eye at the other end thereof, a bait retaining device comprising, in combination:
    an elongated flexible member having a barbed projecting means at a distal end thereof for insertion into the mouth of a bait fish and into the gill structure thereof for securing said bait fish to said member, said member also having at least one eye aperture means at the proximal end thereof for receiving the eye portion of said fish hook when inserted therethrough, said member also including further aperture means intermediate said proximal and distal ends for receiving the barbed point of said fish hook therethrough after said barbed point is inserted through the mouth of said bait fish when said member has been inserted into the mouth of said bait fish.

2. A device as in claim 1 wherein said further aperture means is an elongated slot for receiving the barbed point of said fish hook inserted therethrough.

3. A device as in claim 1 having longitudinal slit means therethrough extending between said barbed projecting means and said eye aperture for allowing overlapping the two segments of said distal end portion of said member thereby facilitating insertion of said device into the mouth of said bait fish.

4. A device as in claim 1 having at least two pairs of barbed projecting means, one behind the other, the members of each pair oppositely disposed on opposing surfaces of said flexible member, and wherein the barbs of the forward pair are larger than those of the rearward pair for permitting field modification of the device for use with smaller bait fish by removal of the larger barbs at the distal end of said device.

* * * * *